US010203907B2

(12) United States Patent
Yang et al.

(10) Patent No.: US 10,203,907 B2
(45) Date of Patent: Feb. 12, 2019

(54) MEASURING PERFORMANCE OF STORAGE SYSTEM

(71) Applicant: EMC Corporation, Hopkinton, MA (US)

(72) Inventors: Ziye Yang, Shanghai (CN); Chenhui Fan, Shanghai (CN); Ping Chen, Shanghai (CN); Xi Chen, Shanghai (CN); Hailan Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/310,474

(22) Filed: Jun. 20, 2014

(65) Prior Publication Data

US 2014/0379943 A1 Dec. 25, 2014

(30) Foreign Application Priority Data

Jun. 21, 2013 (CN) .......................... 2013 1 0272881

(51) Int. Cl.
*G06F 3/06* (2006.01)
*G06F 11/34* (2006.01)

(52) U.S. Cl.
CPC .......... *G06F 3/0653* (2013.01); *G06F 3/0604* (2013.01); *G06F 3/0673* (2013.01); *G06F 11/3414* (2013.01); *G06F 11/3485* (2013.01); *G06F 11/3452* (2013.01)

(58) Field of Classification Search
None
See application file for complete search history.

(56) References Cited

U.S. PATENT DOCUMENTS

| | | | | |
|---|---|---|---|---|
| 7,698,546 | B2* | 4/2010 | Stemen ................. | G06F 9/4411 709/223 |
| 8,705,351 | B1* | 4/2014 | McGlaughlin et al. ...... | 370/230 |
| 9,519,732 | B1* | 12/2016 | Gennari ................. | G06F 17/50 |
| 9,551,983 | B2* | 1/2017 | Cooper .................. | G05B 19/02 |
| 2001/0025303 | A1* | 9/2001 | Fisher ..................... | G06F 3/005 709/217 |
| 2002/0091722 | A1* | 7/2002 | Gupta et al. ................... | 707/204 |
| 2004/0117323 | A1* | 6/2004 | Mindala ................ | G06Q 30/02 705/400 |
| 2006/0059323 | A1* | 3/2006 | Rao ....................... | G06F 9/5016 711/170 |

(Continued)

*Primary Examiner* — Henry Tsai
*Assistant Examiner* — Christopher A Bartels
(74) *Attorney, Agent, or Firm* — BainwoodHuang (57) ABSTRACT

The present disclosure relates to a method and apparatus for measuring performance of a storage system. The method comprises: causing one or more entities to execute a task set comprising multiple tasks, each of the multiple tasks being used for accessing the storage system; obtaining an indicator set of the storage system based on a result of the execution, the indicator set comprising one or more indicators for indicating performance of the storage system; and adjusting the task set based on the indicator set, for subsequent execution by the one or more entities. The method can be executed iteratively. By means of the present invention, workloads for the next round's execution can be intelligently improved according to execution results after each round's execution of workloads, so that performance of the storage system can be obtained more pertinently and efficiently so as to better utilize the storage system.

20 Claims, 3 Drawing Sheets

(56) References Cited

U.S. PATENT DOCUMENTS

| | | | |
|---|---|---|---|
| 2006/0265470 A1* | 11/2006 | Rolia | G06F 9/5027 709/217 |
| 2008/0244209 A1* | 10/2008 | Seelam et al. | 711/168 |
| 2009/0049011 A1* | 2/2009 | Mock | H04L 41/064 |
| 2010/0325356 A1* | 12/2010 | Ash | G06F 12/0804 711/113 |
| 2011/0022711 A1* | 1/2011 | Cohn | 709/225 |
| 2011/0125894 A1* | 5/2011 | Anderson | H04L 9/3213 709/224 |
| 2011/0276366 A1* | 11/2011 | Goyet | G06Q 30/02 705/7.29 |
| 2011/0276695 A1* | 11/2011 | Maldaner | G06F 9/5083 709/226 |
| 2012/0023318 A1* | 1/2012 | Xing | G06F 9/4403 713/2 |
| 2012/0105649 A1* | 5/2012 | Okada | H04N 17/002 348/175 |
| 2014/0095907 A1* | 4/2014 | Nguyen Tien | G06F 1/3203 713/320 |
| 2015/0066467 A1* | 3/2015 | Acar | G06F 17/5036 703/14 |

* cited by examiner

MEASURING PERFORMANCE OF STORAGE SYSTEM

RELATED APPLICATION

This Application claims priority from Chinese Patent Application Serial No. CN201310272881.8 filed on Jun. 21, 2013 entitled "Method and Apparatus for Measuring Performance of a Storage System," the content and teachings of which are hereby incorporated by reference in their entirety.

BACKGROUND

Embodiments of the present invention relate to the field of storage systems, and more specifically, for evaluating performance of a storage system.

With the constant development of computer storage technology, requirements on manageability, security, intelligence and other aspects of storage systems gradually have become a focus are a for research. Quality of Service (QoS) of a storage system is known to be a relatively significant guarantee to satisfy upper-layer application demands, and thus has drawn extensive attention from developers, users and on the likes. Evaluating and measuring QoS of storage systems remains a problem that requires attention and a solution.

SUMMARY

QoS of a storage system (with a typical example of I/O QoS) is rather difficult to measure due to various configurations and combinations of workloads. Currently there exists no efficient and convenient measurement, and it takes an enormous effort and time to evaluate and measure QoS if all possible workloads are to be exhausted. To this end, the present disclosure provides an efficient, quick and convenient method and apparatus for measuring performance of a storage system.

According to one aspect of the present disclosure, there is provided an apparatus and a method for measuring performance of a storage system, by (i) causing one or more (also referred to "at least one") entities to execute a task set wherein the task set comprises multiple tasks, each of the multiple tasks being used for accessing the storage system; (ii) obtaining an indicator set of the storage system based on a result of the execution, the indicator set comprising one or more indicators for indicating performance of the storage system; and (iii) adjusting the task set based on the indicator set, for subsequent execution by the one or more entities.

According to an optional embodiment of the present disclosure, the method further comprises (iv) determining, based on the result of the execution, classes of one or more tasks among the multiple tasks that have been executed; and (v) adjusting the task set based on the classes, for subsequent execution by the one or more entities.

According to an optional embodiment of the present disclosure, adjusting the task set based on the classes further comprises: deleting, from the task set, a task in any class among the one or more classes.

According to an optional embodiment of the present disclosure, the method further comprises iteratively executing the steps (i)-(iii) and steps (i)-(v) until a predefined condition is met, wherein the predefined condition may comprise, for example, a predefined number of execution of the method and/or a predefined degree of stability of the indicators.

According to an optional embodiment of the present disclosure, adjusting the task set comprises: creating, deleting or modifying one or more tasks in the task set.

According to an optional embodiment of the present disclosure, an initial task set is generated based on alleged performance parameters of the storage system or generated randomly.

According to an optional embodiment of the present disclosure, accessing the storage system comprises input/output access to the storage system.

According to an optional embodiment of the present disclosure, step (iii) further comprises: determining whether or not one or more indicators in the indicator set satisfy alleged performance parameters of the storage system; and upon determining the existence of an indicator that does not satisfy the alleged performance parameters, adjusting the task set with respect to the indicator in the indicator set not satisfying the alleged performance parameters.

According to an optional embodiment of the present disclosure, step (iii) further comprises: determining a similarity between the storage system and a reference storage system based on a degree to which one or more indicators in the indicator set match corresponding indicator(s) of the reference storage system; and adjusting the task set based on the similarity.

According to an optional embodiment of the present disclosure, adjusting the task set based on the similarity further comprises: adjusting the task set with respect to other indicator of the reference storage system when the similarity is high.

According to an optional embodiment of the present disclosure, the apparatus further comprises: a class determining module configured to determine, based on the result of the execution, classes of one or more tasks among the multiple tasks that have been executed; and a second adjusting module configured to adjust the task set based on the classes, for subsequent execution by the one or more entities.

According to an optional embodiment of the present disclosure, the second adjusting module further comprises: a deleting module configured to delete, from the task set, a task in any class among the one or more classes.

According to an optional embodiment of the present disclosure, the apparatus further comprises: a iterating module configured to cause the executing module, the indicator obtaining module and the first adjusting module to iteratively execute until a predefined condition is met; or configured to cause the executing module, the indicator obtaining module, the first adjusting module, the class determining module and the second adjusting module to iteratively execute until a predefined condition is met.

According to an optional embodiment of the present disclosure, the predefined condition comprises a predefined number of executions of the iterating module and/or a predefined degree of stability of the indicators.

According to an optional embodiment of the present disclosure, adjusting the task set by the first adjusting module and/or the second adjusting module comprises: creating, deleting or modifying one or more tasks in the task set.

According to an optional embodiment of the present disclosure, there is further comprised an initial task set generating module configured to generate an initial task set based on alleged performance parameters of the storage system or generate an initial task set randomly.

According to an optional embodiment of the present disclosure, the first adjusting module further comprises: a comparing module configured to determine whether or not one or more indicators in the indicator set satisfy alleged performance parameters of the storage system; and a directional adjusting module configured to, upon determining there is an indicator that does not satisfy the alleged performance parameters, adjust the task set with respect to the indicator in the indicator set not satisfying the alleged performance parameters.

According to an optional embodiment of the present disclosure, the first adjusting module further comprises: a matching module configured to determine a similarity between the storage system and a reference storage system based on a degree to which one or more indicators in the indicator set match corresponding indicator(s) of the reference storage system; and a similarity adjusting module configured to adjust the task set based on the similarity.

According to an optional embodiment of the present disclosure, the similarity adjusting module further comprises: an adjusting sub-module configured to adjust the task set with respect to other indicator of the reference storage system when the similarity is high.

According to an optional embodiment, it should be obvious to one skilled in the art that a single module may be configured to perform the tasks associated with each of the modules listed above, or one or more of these modules can be combined into a single module to execute the tasks assigned.

Note the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

DETAILED DESCRIPTION

Principles and spirit of the present disclosure will be described below with reference to the accompanying drawings, in which exemplary embodiments have been illustrated. These embodiments are presented only to enable those skilled in the art to better understand and further implement the present disclosure, rather than limiting the scope of the present disclosure in any way.

Figure 1:
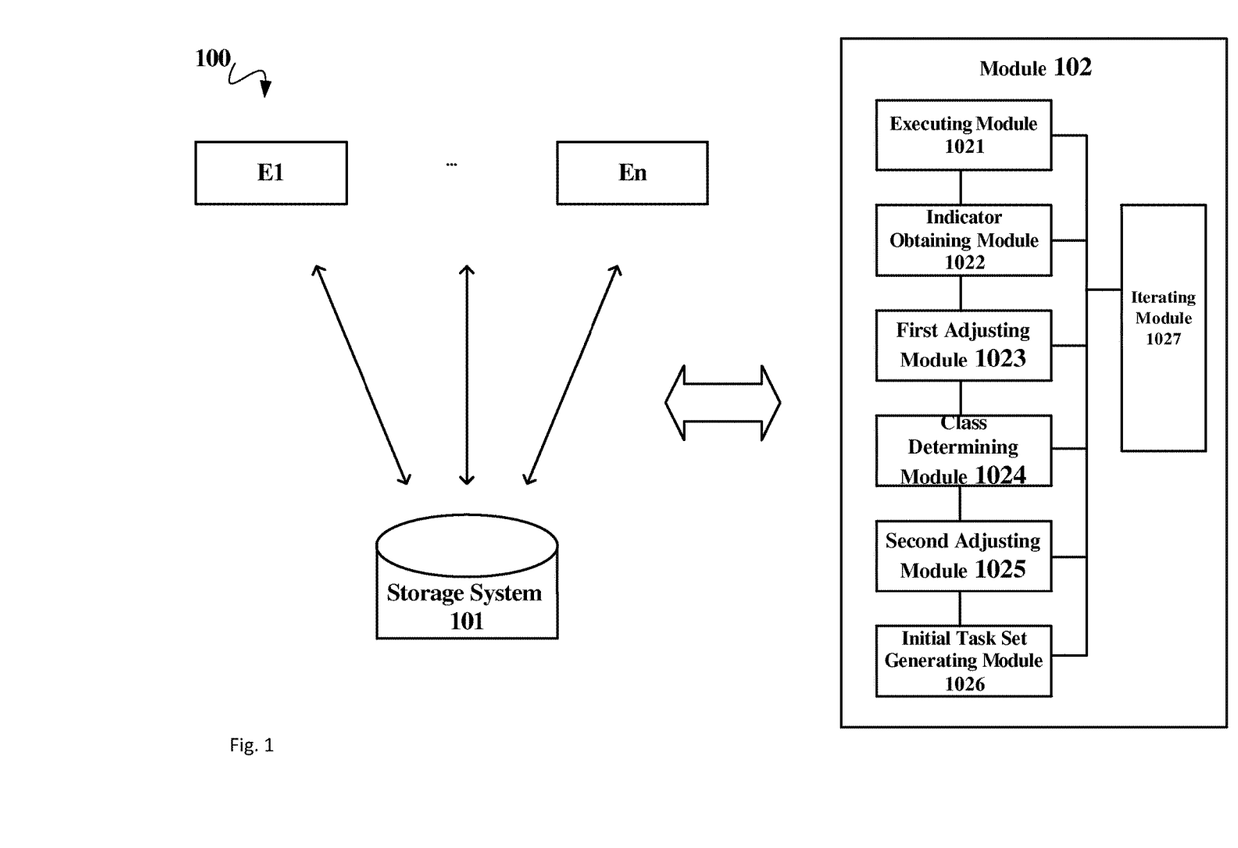
FIG. 1 shows a schematic block diagram of a system 100 in which one aspect of the present invention may be implemented.

FIG. 1 shows a schematic block diagram of a system 100 in which one aspect of the present disclosure may be implemented.

FIG. 1 illustrates an exemplary embodiment of a system 100 comprising several entities $E_1$ to $E_n$, a storage system 101 and an apparatus 102 for measuring performance of storage system 101. Entities $E_1$ to $E_n$ share I/O resources among them and may perform access like input/output (I/O) to the storage system while executing workloads. An example of entities includes but not limited to a host or a virtual machine VM.

To measure performance of storage system 101, apparatus 102 may comprise executing module 1021, indicator obtaining module 1022 and first adjusting module 1023. It should be obvious to one skilled in the art that these modules may exist separately or may be combined into a single module, wherein the single module is configured to perform the tasks associated with all the individual modules. Among them, executing module 1021 is configured to execute a task set comprising multiple tasks for one or more entities, each of the multiple tasks being used for accessing the storage system. Specifically, executing module 1021 may select one part of entities (e.g. $E_1$-$E_n$) from multiple entities, connect them to storage system 101 and allocate workloads (e.g. I/O workloads; in this disclosure "workloads" and "tasks" are interchangeable) to them as tasks. Entities $E_1$-$E_n$ carry out the allocated I/O workloads for example, thereby interacting with storage system 101.

After one round's execution of workloads, indicator obtaining module 1022 is configured to obtain an indicator set of storage system 101 based on execution results, the indicator set comprising one or more indicators for indicating performance of the storage system. In one implementation, indicators in the indicator set may be obtained based on timing analysis algorithms and statistical models. As an example, the indicator may be used to reflect key factors adopted by the storage system that are critical to performance of the storage system, such as I/O scheduling algorithms, network I/O control approach, cache management policy.

First adjusting module 1023 is configured to adjust the task set based on the indicator set, for subsequent execution by the one or more entities $E_1$-En. In an embodiment including a detail implementation, new workloads generation rule may be derived in accordance with the execution results, and workloads for the next round's execution can be generated in accordance with the new generation rule. Those skilled in the art should understand while providing a storage system, "alleged performance parameters" provided by the manufacturer are also provided, which reflect the committed Quality of Service of the storage system and comprise, for example, input/output operations per second, execution latency commitments, etc. Therefore, in one preferred embodiment, first adjusting module 1023 may further comprise comparing module (not shown in FIG. 1) configured to determine whether or not the one or more indicators in the indicator set satisfy alleged performance parameters of the storage system; and directional adjusting module (not shown in FIG. 1) configured to, upon determining there is an indicator that does not satisfy the alleged performance parameters, adjusting setting of the task set with respect to the indicator not satisfying the alleged performance parameters, thereby breaking the committed QoS of the storage system and making it possible to measure the system's performance more pertinently and efficiently. In another preferred embodiment, apparatus 102 further comprises initial task set generating module 1026 configured to generate an initial task set based on alleged performance parameters of the storage system or randomly generate an initial task set.

In a further exemplary embodiment, there may further exist storage systems for reference (also referred to as "reference storage systems" in this disclosure), and I/O algorithms and relevant configuration parameters adopted by these storage systems are all known. For instance, Noop (one of famous I/O algorithms), deadline, AS, CFQ can be the known ones; and the I/O scheduling algorithm in VMware's ESX servers could be the unknown. Those skilled in the art should understand examples of the known and unknown algorithms are only illustrative and exemplary in nature rather than being restrictive. Other I/O algorithms with known/unknown performance also fall within the scope of consideration of the present disclosure. With a known I/O algorithm, properties of the known I/O algorithm are introduced.

For example, the elevator queue maintained by Noop is merely a single FIFO queue. As a result, it just serves the concurrent requests from different processes in FIFO manner; in contrast, Deadline, AS and CFQ include several sub data structures that support I/O requests merging and sorting, and thus these algorithms can serve more I/O requests from one process in a scheduling period, and the frequency of I/O service switching events is relatively low. In addition, deadline guarantees that each I/O request can be timely completed without starvation, and maintains both read and write FIFO queues for throughput improvement; AS has a time window to anticipatorily execute the incoming I/O requests from the same process; and CFQ is a complete fairness algorithm which has several priority queues to ensure the disk I/O bandwidth among process groups.

Based thereon, first adjusting module 1023 in the exemplary embodiment of the present disclosure may comprise a matching module (not shown in FIG. 1) configured to determine similarity between the storage system and a reference storage system based on a degree to which one or more indicators in the indicator set match corresponding indicator(s) of the reference storage system; and a similarity adjusting module (not shown in FIG. 1) configured to adjust the task set based on the similarity. More preferably, the similarity adjusting module further comprises: adjusting sub-module configured to adjust the task set with respect to other indicators of the reference storage system when the similarity is high. For example, when it is found by entities executing the task set (workloads) that one or more indicators of a to-be-measured storage system are highly close to or the same as a reference storage system and it is confirmed that the two storage systems are extremely similar, it may be highly probabilistically considered that the to-be-measured storage system adopts a similar I/O algorithm to the reference storage system, e.g. Noop, and thus the task set may be adjusted with respect to other properties of the storage system adopting Noop, for subsequent execution by entities $E_1$-$E_N$.

Optionally, apparatus 102 may also comprise class determining module 1024 configured to determine class(es) of one or more tasks among the multiple tasks that have been executed, based on a result of the execution; and second adjusting module 1025 configured to adjust the task set based on the class, for subsequent execution by the one or more entities. As described above, while generating indicators reflecting the storage system's performance based on an execution result, representative classes of workloads may be extracted from executed workloads based on the execution result, such as read I/O operation class or write I/O operation class, orderly I/O operation class and disorderly I/O operation class. Regarding representative classes being extracted, since workloads belonging to the same representative classes have homogeneous characteristics, results from executing such workloads need not be tested again. Thus the same classes of tasks (workloads) may no longer be generated when adjusting the task set for next execution. Second adjusting module 1025 may preferably further comprise deleting module (not shown in FIG. 1) configured to delete from the task set a task of any class of the one or more classes. Note the extracting of representative classes may be guided by the obtained indicators of the storage system.

With reference to Examples 1-3, detailed illustration is presented below to examples of adjusting the task set based on classes. Those skilled in the art should understand Examples 1-3 are only for the purpose of better understanding the present disclosure and are not intended to limit the protection scope of the present invention.

EXAMPLE 1

If the key factor (KF) reflecting performance in a targeted storage system is an I/O scheduling algorithm and the algorithm is Noop, and the property of Noop is serving the I/O requests in the FIFO (first-in first-out) manner, this manner indicates that the I/O execution results can be estimated if the workload execution sequence is determined.

EXAMPLE 2

If the targeted KF is the I/O Cache replacement policy, and if the policy is LRU (Least Recently Used), then the I/O execution results can also be estimated.

EXAMPLE 3

If the targeted KF is the I/O scheduling algorithm, and if it is profiled that the write priority is higher than read, then the workloads may be partitioned into different classes.

As a preferred embodiment, the adjusting of the task set by first adjusting module 1023 and/or second adjusting module 1025 comprises adding, deleting or modifying one or more tasks in the task set.

In addition, note to obtain a stable indicator set reflecting the system performance, preferably apparatus 102 further comprises iterating module 1027 configured to cause the executing module, the indicator obtaining module and the first adjusting module to iteratively execute until a predefined condition is met; or configured to cause the executing module, the indicator obtaining module, the first adjusting module, the class determining module and the second adjusting module to iteratively execute until a predefined condition is met. The predefined condition may comprise, for example, predefined number of execution of the method and/or predefined degree of stability of the indicator.

Through iterative execution by modules 1021-1024/1021-1026, the latest system performance indicators and representative workload classes can be obtained according to execution results of the last round. As a result, workloads to be executed in the next round can be pertinently designed according to execution results of the last round, so as to obtain performance of the storage system more efficiently and conveniently.

Figure 2:
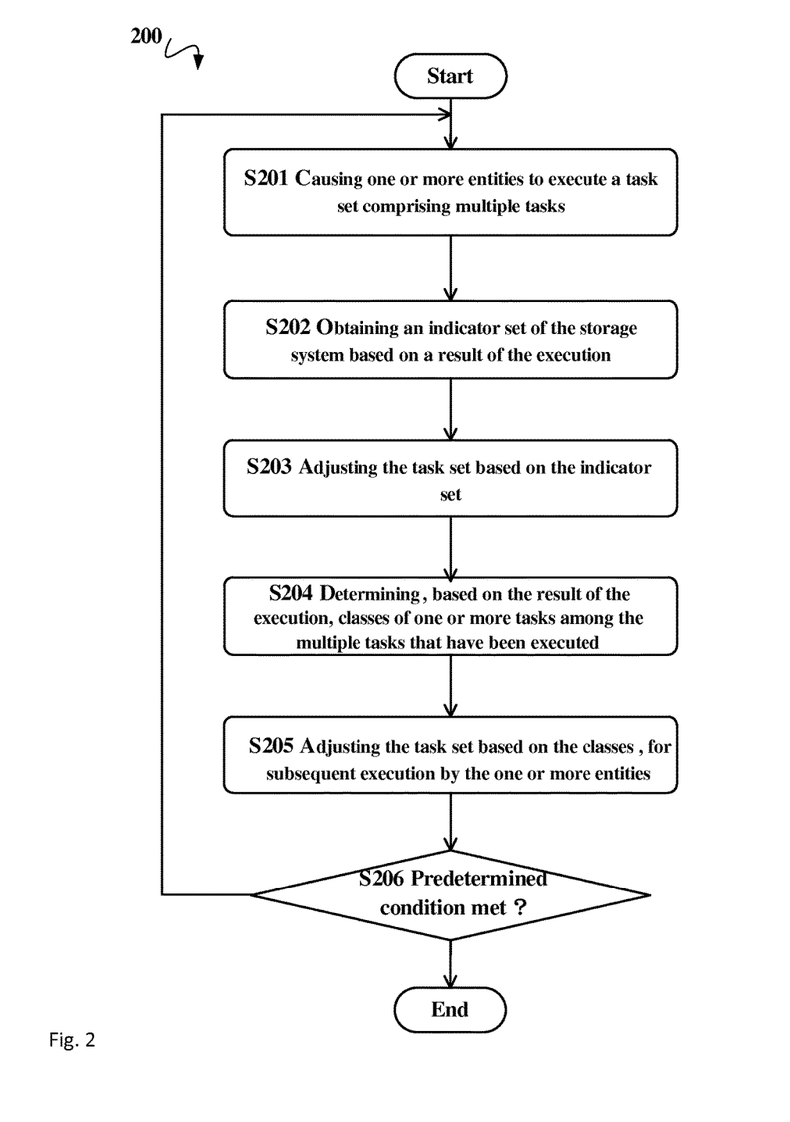
FIG. 2 shows a flowchart of a method 200 for measuring performance of a storage system and for use in, for example, an apparatus 102 shown in FIG. 1.

FIG. 2 illustrates an exemplary flowchart of a method 200 of measuring performance of a storage system and for use in, for example, apparatus 102 shown in FIG. 1. It should be understood that steps in method 200 may be executed in different orders and/or in parallel. Method 200 may further comprise additional step(s) and/or steps not shown, and the step illustrated should not be construed as a limitation of the scope of this disclosure. Those skilled in the art should understand for the simplicity purpose, like terminology as above denote similar meaning throughout the illustration of method 200 below.

After method 200 starts, in step S201 one or more entities are caused to execute a task set comprising multiple tasks, each of the multiple tasks being used for accessing the storage system.

Next method 200 proceeds to step S202 in which an indicator set of the storage system is obtained based on a result of the execution, the indicator set comprising one or more indicators for indicating performance of the storage system.

Method 200 then proceeds to step S203 in which the task set is adjusted based on the indicator set, for subsequent execution by the one or more entities.

According to one embodiment of the present disclosure, further method 200 may optionally comprise step S204 in which classes of one or more tasks among the multiple tasks that have been executed are determined based on the result of the execution; and step S205 in which the task set is adjusted based on the classes, for subsequent execution by the one or more entities.

In one embodiment of the present disclosure, adjusting the task set based on the classes in step S205 further comprises: deleting from the task set a task in any class among the one or more classes.

As described previously, the execution of steps S201-S203 according to one aspect of the present disclosure makes it possible to pertinently design works for the next round according to results of the previous execution, so as to obtain performance parameters of the storage system more efficiently. Furthermore, the execution of steps S201-S205 according to a further aspect of the present disclosure makes it possible to identify representative workloads according to results of the previous execution, so that when designing workloads to be executed in the next round, workloads belonging to the same type of representative workloads can be avoided, and the method's efficiency is further improved.

In one implementation of the present disclosure, method 200 further comprises step S206 in which it is determined whether execution of method 200 meets a predefined condition or not; if yes, method 200 ends, otherwise returns to step S201 to cyclically iterate method 200. The predefined condition may comprise, for example, a predefined number of executions of the method and/or a predefined degree of stability of the indicators. Adjusting the task set in steps S203 and S205 comprises creating, deleting or modifying one or more tasks in the task set. An initial task set may be generated based on alleged performance parameters of the storage system or generated randomly. And further, accessing comprises input/output access to the storage system.

In one implementation of the present disclosure, step S203 may further comprise: determining whether or not one or more indicators in the indicator set satisfy alleged performance parameters of the storage system, and upon determining an indicator that does not satisfy the alleged performance parameters, adjusting the task set with respect to the indicator in the indicator set not satisfying the alleged performance parameters, so that the task set can be designed with respect to the indicator.

In another implementation of the present disclosure, step S203 may also comprise: determining a similarity between the storage system and a reference storage system based on a degree to which one or more indicators in the indicator set match corresponding indicator(s) of the reference storage system; and adjusting the task set based on the similarity. Specifically, adjusting the task set based on the similarity further comprises: adjusting the task set with respect to other indicator of the reference storage system when the similarity is high.

The spirit and principles of the present disclosure have been illustrated in conjunction with several concrete and/or exemplary embodiments. According to the embodiments of the present disclosure, various performances (including advantages and disadvantages) of a targeted storage system can be obtained efficiently and conveniently, thereby making it convenient to further leverage the targeted storage system.

Figure 3:
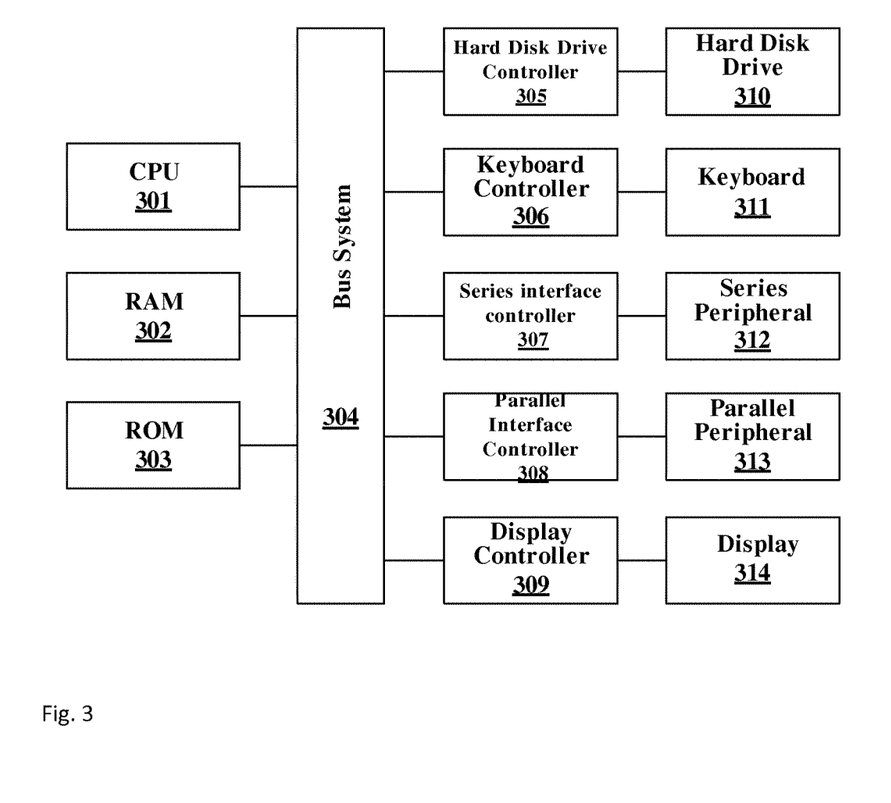
FIG. 3 shows a block diagram of a computer system which is applicable to implement the embodiments of the present invention.

FIG. 3 illustrates a schematic block diagram of a computer system that is applicable to implement the embodiments of the present disclosure. As illustrated in FIG. 3, the computer system may include: CPU (Central Process Unit) 301, RAM (Random Access Memory) 302, ROM (Read Only Memory) 303, System Bus 304, Hard Drive Controller 305, Keyboard Controller 306, Serial Interface Controller 307, Parallel Interface Controller 308, Display Controller 309, Hard Drive 310, Keyboard 311, Serial Peripheral Equipment 312, Parallel Peripheral Equipment 313 and Display 314. Among above devices, CPU 301, RAM 302, ROM 303, Hard Drive Controller 305, Keyboard Controller 306, Serial Interface Controller 307, Parallel Interface Controller 308 and Display Controller 309 are coupled to the System Bus 304. Hard Drive 310 is coupled to Hard Drive Controller 305. Keyboard 311 is coupled to Keyboard Controller 306. Serial Peripheral Equipment 312 is coupled to Serial Interface Controller 307. Parallel Peripheral Equipment 313 is coupled to Parallel Interface Controller 308. And, Display 314 is coupled to Display Controller 309.

It should be understood that the structure as illustrated in FIG. 3 is only for the exemplary purpose rather than any limitation to the present disclosure. In some cases, some devices may be added to or removed based on specific situations.

Specifically, in addition to hardware embodiments, the embodiments of the present disclosure may further be implemented in the form of a computer program product. For example, method 200 described with reference to FIG. 2 may be implemented by a computer program product. The computer program product may be stored in RAM 302, ROM 303, Hard Drive 310 as shown in FIG. 3 and/or any appropriate storage media, or be downloaded to computer system 300 from an appropriate location via a network. The computer program product may include a computer code portion that comprises program instructions executable by an appropriate processing device (e.g., CPU 301 shown in FIG. 3). The program instructions at least may comprise: instructions for causing one or more entities to execute a task set comprising multiple tasks, each of the multiple tasks being used for accessing the storage system; instructions for obtaining an indicator set of the storage system based on a result of the execution, the indicator set comprising one or more indicators for indicating performance of the storage system; and instructions for adjusting the task set based on the indicator set, for subsequent execution by the one or more entities.

The spirit and principles of the present invention have been illustrated in conjunction with several concrete embodiments. According to the embodiments of the present disclosure, workloads for the next round's execution can be intelligently improved according to execution results after each round's execution of workloads, so that performance of the storage system can be obtained more pertinently and efficiently so as to better utilize the storage system.

Note the embodiments of the present disclosure can be implemented in software, hardware or combination of software and hardware. The hardware portion can be implemented by using dedicated logic; the software portion can be stored in a memory and executed by an appropriate instruction executing system such as a microprocessor or dedicated design hardware. Those of ordinary skill in the art may appreciate the above system and method can be implemented by using computer-executable instructions and/or by being contained in processor-controlled code, which is provided on carrier media like a magnetic disk, CD or DVD-ROM, programmable memories like a read-only memory (firmware), or data carriers like an optical or electronic signal carrier. The system of the present disclosure can be embodied as semiconductors like very large scale integrated circuits or gate arrays, logic chips and transistors, or hardware circuitry of programmable hardware devices like field programmable gate arrays and programmable logic devices, or software executable by various types of processors, or a combination of the above hardware circuits and software, such as firmware.

Note although several means or submeans of the system have been mentioned in the above detailed description, such division is merely exemplary and not mandatory. In fact, according to the embodiments of the present disclosure, the features and functions of two or more means described above may be embodied in one means. On the contrary, the features and functions of one means described above may be embodied by a plurality of means.

In addition, although in the accompanying drawings operations of the method of the present disclosure are described in specific order, it is not required or suggested these operations be necessarily executed in the specific order or the desired result be achieved by executing all illustrated operations. On the contrary, the steps depicted in the flowcharts may change their execution order. Additionally or alternatively, some steps may be omitted, a plurality of steps may be combined into one step for execution, and/or one step may be decomposed into a plurality of steps for execution.

Although the present disclosure has been described with reference to several embodiments, it is to be understood the present disclosure is not limited to the embodiments disclosed herein. The present disclosure is intended to embrace various modifications and equivalent arrangements comprised in the spirit and scope of the appended claims. The scope of the appended claims accords with the broadest interpretation, thereby embracing all such modifications and equivalent structures and functions.

What is claimed is:

1. A method for measuring performance of a storage system, the method comprising:
   (i) causing at least one entity to execute a task set, from a plurality of task sets, comprising multiple tasks, each of the multiple tasks being used for accessing the storage system;
   (ii) obtaining an indicator set of the storage system based on a result of the execution, the indicator set comprising at least one indicator for indicating performance of the storage system; and
   (iii) adjusting the task set based on the indicator set, to satisfy performance parameters, for subsequent execution by the at least one entity;
   wherein, using the indicator set of the storage system, a type is enabled to be associated with each task of the task set, wherein the type is categorized into classes of tasks;
   wherein each class is used to estimate performance of other tasks;
   wherein the adjusting the task set based on the indicator set is enabled to comprise deleting at least one task from the task set.

2. The method according to claim 1, further comprising:
   (iv) determining, based on the result of the execution, classes of at least one task among the multiple tasks that have been executed; and
   (v) adjusting the task set based on the classes, for subsequent execution by the at least one entity.

3. The method according to claim 2, wherein the adjusting the task set based on the classes in step (v) further comprises: deleting, from the task set, a task in any class among the at least one class.

4. The method according to claim 2, further comprising iteratively executing the steps (i)-(iii) and the steps (i)-(v) until a predefined condition is met.

5. The method according to claim 4, wherein the predefined condition comprises at least one of a predefined number of execution and a predefined degree of stability of the indicators.

6. The method according to claim 2, wherein adjusting the task set comprises at least one of creating, deleting and modifying at least one task in the task set.

7. The method according to claim 2, wherein an initial task set is generated based on at least one performance parameters of the storage system or being randomly generated.

8. The method according to claim 2, wherein the step of accessing comprises input/output access to the storage system.

9. The method according to claim 1, wherein step (iii) further comprises: determining whether or not at least one of the indicators in the indicator set satisfy the performance parameters of the storage system; and
   upon determining there is an indicator does not satisfy the performance parameters, adjusting the task set with respect to the indicator in the indicator set not satisfying the performance parameters.

10. The method according to claim 1, wherein step (iii) further comprises: determining a similarity between the storage system and a reference storage system based on a degree to which one or more indicators in the indicator set match corresponding indicator(s) of the reference storage system; and
    adjusting the task set based on the similarity.

11. The method according to claim 10, wherein adjusting the task set based on the similarity further comprises: adjusting the task set with respect to other indicator of the reference storage system when the similarity is high.

12. An apparatus for measuring performance of a storage system, comprising:
    an executing module configured to cause at least one entity to execute a task set, from a plurality of task sets, comprising multiple tasks, each of the multiple tasks being used for accessing the storage system;

an indicator obtaining module configured to obtain an indicator set of the storage system based on a result of the execution, the indicator set comprising at least one indicator for indicating performance of the storage system; and a first adjusting module configured to adjust the task set based on the indicator set, to satisfy performance parameters, for subsequent execution by the at least one entity;

wherein, using the indicator set of the storage system, a type is enabled to be associated with each task of the task set, wherein the type is categorized into classes of tasks;

wherein each class is used to estimate performance of other tasks;

wherein the adjusting the task set based on the indicator set is enabled to comprise deleting at least one task from the task set.

13. The apparatus according to claim 12, further comprising:

a class determining module configured to determine, based on the result of the execution, classes of the at least one task among the multiple tasks that have been executed; and a second adjusting module configured to adjust the task set based on the classes, for subsequent execution by the at least one entity.

14. The apparatus according to claim 13, wherein the second adjusting module further comprises:

a deleting module configured to delete, from the task set, a task in any class among the at least one class.

15. The apparatus according to claim 13, further comprising a iterating module configured to cause the executing module, the indicator obtaining module and the first adjusting module to iteratively execute until a predefined condition is met; or configured to cause the executing module, the indicator obtaining module, the first adjusting module, the class determining module and the second adjusting module to iteratively execute until a predefined condition is met.

16. The apparatus according to claim 15, wherein the predefined condition comprises at last one of a predefined number of execution of the iterating module and a predefined degree of stability of the indicators.

17. The apparatus according to claim 13, wherein adjusting the task set by the first adjusting module and the second adjusting module comprises: creating, deleting or modifying at least one task in the task set.

18. The apparatus according to claim 13, further comprising: an initial task set generating module configured to generate an initial task set based on at least one of the performance parameters of the storage system and generate an initial task set randomly.

19. The apparatus according to claim 13, wherein the step of accessing comprises input/output access to the storage system.

20. The apparatus according to claim 13, wherein the first adjusting module further comprises:

a comparing module configured to determine whether or not the at least one indicators in the indicator set satisfy the performance parameters of the storage system; and a directional adjusting module configured to, upon determining that an indicator that does not satisfy the performance parameters, adjust the task set with respect to the indicator in the indicator set not satisfying the alleged performance parameters.

* * * * *